Dec. 2, 1958
E. B. ANDER
2,862,684
SOLENOID VALVE
Filed Sept. 16, 1957
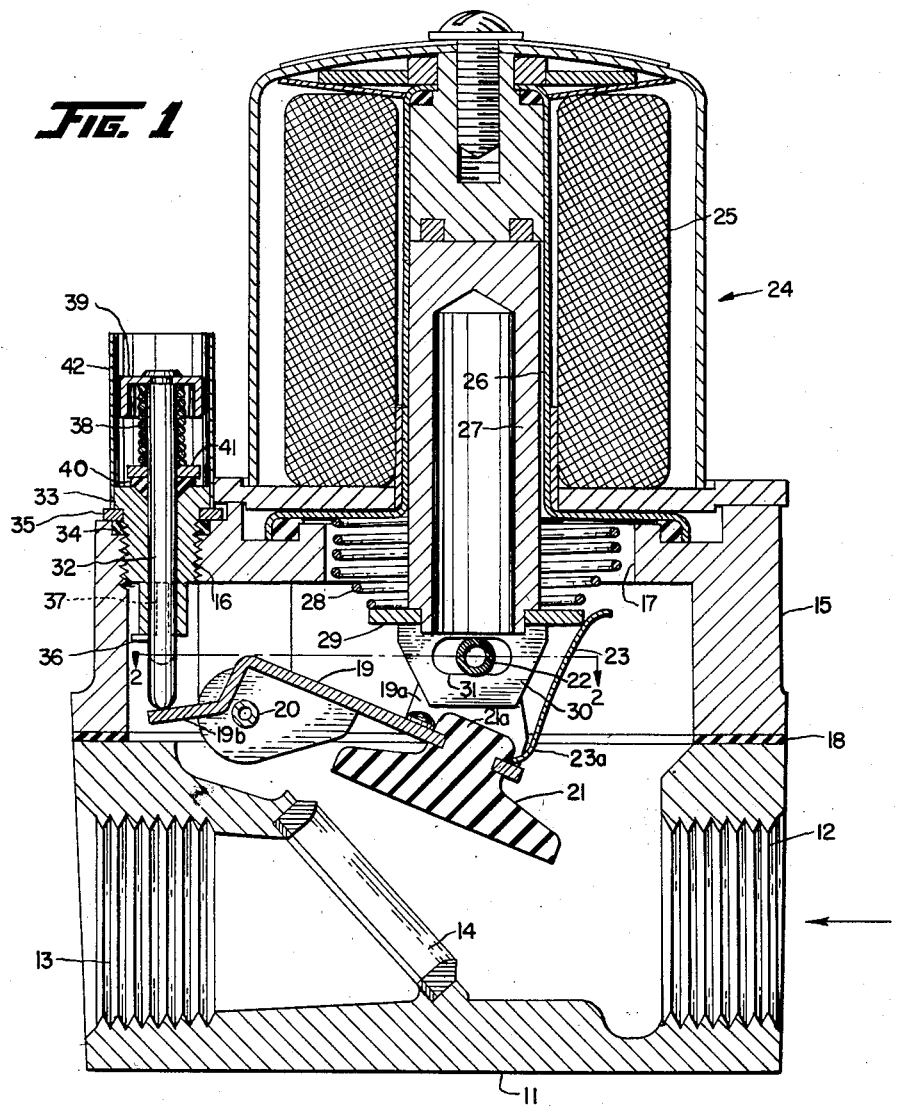
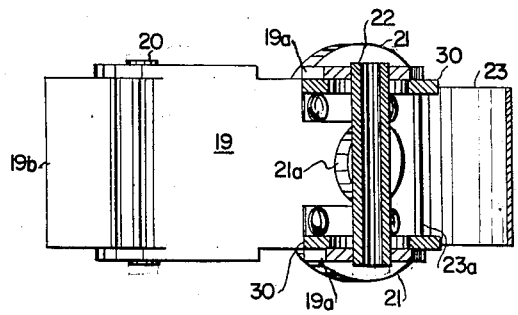
INVENTOR.
ERIC B. ANDER
BY *Alan M. Staubly*
ATTORNEY

2,862,684

SOLENOID VALVE

Eric B. Ander, Minneapolis, Minn., assignor to Minneapolis-Honeywell Regulator Company, Minneapolis, Minn., a corporation of Delaware Application September 16, 1957, Serial No. 684,354

4 Claims. (Cl. 251—130)

This invention relates to solenoid actuating means for various types of controls, and, more particularly, to a solenoid actuator for a valve.

There has been considerable effort on the part of the valve manufacturing industry to reduce the hum in alternating current energized solenoid valves. Part of the hum has been eliminated by the use of shading rings in either the plunger stop or in the plunger that engages the stop. Means have also been used to in some way mechanically hold the plunger against vibration after it has been drawn into the solenoid tube by energization of the solenoid coil. It is this latter type of means for reducing solenoid hum that this invention is primarily concerned.

One of the objects of the invention is to provide a quiet operating solenoid valve.

Another object of the invention is to provide resilient means in a solenoid operated valve wherein the resilient means will hold the solenoid plunger against the surrounding plunger tube when the plunger is drawn into the tube and to hold the valve connecting mechanism from vibrating.

Still another object of the invention is to provide an inexpensive, reliable, simple and sturdy solenoid operating valve.

Other objects of the invention will become apparent upon reading the following detailed description of the invention in conjunction with the accompanying drawing wherein:

Figure 1 is a vertical sectional view of a solenoid valve embodying the invention; and Figure 2 is a sectional view taken along line 2—2 in Figure 1 of the drawing.

The solenoid valve comprises a valve body 11 having a threaded inlet 12, a threaded outlet 13 and a valve seat member 14 positioned therebetween, and an upper casting or housing 15 having a large opening in the bottom thereof positioned over an opening in the top of a valve body 11, and two openings 16 and 17 in the top wall thereof. The housing 15 is sealingly bolted or otherwise secured to the body 11 with a gasket 18 therebetween.

A lever 19 is pivoted intermediate its ends in the housing 15 on a tubular pivot member 20. One free end of the lever 19 carries a valve disc member 21, which is made of rubber or any other suitable material. The lever 19 has two upwardly extending arms 19a on opposite sides of the lever and carries a tubular pivot 22 between the upper ends of the arms 19a. A leaf spring 23, having two arm extensions 23a which are bent at right angles to the main body portion of the leaf spring, are riveted to the lever 19 with the arms straddling a button portion 21a of the disc 21 which extends through the lever 19.

Mounted on the housing 15 is a solenoid 24 comprising a solenoid coil 25, a solenoid tube 26 and a solenoid plunger 27. The solenoid is secured to the housing 15 by bolts (not shown) in a conventional manner, with the solenoid plunger 27 extending through the opening 17 in the housing 15. A spring 28 positioned between the bottom of the solenoid and an annular shoulder or washer 29 positioned at the bottom of the solenoid plunger, normally biases the solenoid plunger outwardly of the solenoid tube. The plunger 27 also has a downwardly extending rib 30, which is welded or otherwise secured to the plunger and which has a transversely extending slot 31 therein through which the pivot 22 extends. It is thus seen that the solenoid plunger has a connection with the valve lever 19 that permits transverse movement of the pivot in the slot 31 or transverse movement of the plunger with respect to the pivot.

Positioned in the threaded opening 16 in the housing 15 is a manually operable valve actuating plunger 32 that is held therein by means of a guide bolt 33 threaded into the opening 16, with an O-ring 34 and washer 35 therebetween. The plunger 32 has a laterally extending pin 36 thereon that is adapted to bear against the inner end of guide bolt 33 when the plunger is moved inwardly, the pin 36 sliding in a slot 37 formed in the side wall of the lower end of the guide bolt, and by rotation of the plunger once the pin is past the end of the bolt. It will be observed that in this innermost position of the plunger 32, the plunger has engaged an extension 19b of the lever 19 so as to rotate the lever counterclockwise, to raise the solenoid plunger and to move the valve 21 to its open position. A compression spring 38 positioned between a handle 39 at the upper end of the plunger 32 normally holds the plunger 32 in an inactive or retracted position with the pin 36 against the upper end of the slot 37. The spring 38 also provides a sealing means between the plunger 32 and the bolt 33 by compressing an O-ring 40 between the two. A washer 41 is positioned between the O-ring 40 and the adjacent end of the spring 38. A sleeve 42 fits down over the handle 39 and plunger 32 and over the head of the bolt 33 to serve as a guard against damage to the plunger.

Operation

The solenoid valve is illustrated in a condition wherein the manual operator is holding the valve in its open position. In this position, the leaf spring 23 is bearing against the washer 29 surrounding the solenoid plunger and is resiliently holding the left-hand side of the plunger, as viewed in the drawing, against the side of tube 26. While the plunger is illustrated as being in contact with the left side of the plunger tube for the full length of the plunger, it is to be understood that on occasions, the plunger may be in contact with the left-hand side of the plunger tube at the lower end of the plunger tube and the upper end of the plunger may be in contact with the right-hand of the plunger tube, due to the leaf spring 23 pivoting the plunger about the lower left-hand edge of the plunger tube. In either position, however, there is a firm holding of the plunger against vibration due to the fact that it is not free to move transversely in the solenoid tube. It is also to be noted that there is a slight component of force tending to shove the valve lever away from the solenoid plunger, axially of the plunger, so that there will be no rattle or vibration between the pivot 22 and the slot 31 of the plunger or between the pivot 20 and the lever 19.

The valve 21 may be permitted to be closed, by the bias of spring 28, by rotating the manually operable actuating stem 32 to a position wherein the arm 36 is in alignment with the slot 37. This will enable the spring 38 to return the pin 36 to the top of the slot 37 and the lower end of the stem 32 out of engagement with the extension 19b of the lever. When the valve 21 is seated on the valve seat 14, the leaf spring 23 will be spaced from the washer 29 on the solenoid plunger so that the plunger is free to move freely in the solenoid tube.

Upon energization of the solenoid coil 25, the plunger 27 moves inwardly of the solenoid tube and after it has moved a short distance, the spring 23 comes into engagement with the washer 29 and gradually increases in the transverse force it applies to the washer 29 until the maximum force is reached when the plunger has engaged the end of the solenoid tube. As mentioned above, the bias set up between the solenoid plunger and the lever 19 effectively prevents vibration of the plunger 27 and also prevents vibration of the valve actuating linkage due to the flow of fluid through the valve body.

Having described the preferred embodiment of the invention, I claim:

1. A control device comprising a housing, a lever pivoted in said housing, a control member carried by said lever, a solenoid mounted in said housing, a plunger in said solenoid and having a slot therein extending transversely with respect to the axis of said plunger, a pivot on said lever and extending through said slot, and a leaf spring secured to said lever and having a portion that is out of engagement with said plunger when said solenoid is de-energized and is in transversely biasing engagement with the adjacent end of said plunger when said solenoid is energized.

2. A control device comprising a housing, a lever pivoted intermediate its ends in said housing, a control member carried by one end of said lever, a solenoid mounted on said housing, the plunger of said solenoid having a slot therein extending transversely with respect to the axis of said plunger, a pivot on said lever and extending through said slot, and a leaf spring secured to said lever and having a free end that is out of engagement with said plunger when said solenoid is de-energized and is in transversely biasing engagement with the adjacent end of said plunger when said solenoid is energized.

3. In a control device, the combination comprising a housing, a lever pivoted in said housing, a control member carried by said lever, a solenoid mounted in said housing, the plunger of said solenoid having an extension with an opening therein extending transversely with respect to the axis of said plunger, a pivot on said lever and extending through said opening, a leaf spring secured to said lever and having a free end that is out of engagement with said plunger when said solenoid is de-energized and is in transversely biasing engagement with the adjacent end of said plunger when said solenoid is energized, and manually operable means positioned to actuate said lever and to hold the valve in open position.

4. A control device comprising a housing, a lever pivoted intermediate its ends in said housing, a valve carried by one end of said lever, a solenoid mounted on said housing, a plunger in said solenoid having a slot therein extending transversely with respect to the axis of said plunger, a pivot on said lever and extending through said slot, and an L-shaped leaf spring secured to said lever and having a free end extending at right angles to said lever and at an acute angle to said plunger, said spring being out of engagement with said plunger when said solenoid is de-energized and being in transversely biasing engagement with the adjacent end of said plunger when said solenoid is energized.

References Cited in the file of this patent

UNITED STATES PATENTS

| 1,081,693 | Parker | Dec. 16, 1913 |
| 2,650,617 | Wasser | Sept. 1, 1953 |

FOREIGN PATENTS

| 146,071 | Great Britain | Apr. 16, 1952 |